June 17, 1952 — R. M. CARRIER, JR., ET AL — 2,600,966
METHOD OF AND APPARATUS FOR CONTINUOUSLY WEIGHING AGGREGATE
Filed Aug. 12, 1947 — 2 SHEETS—SHEET 1
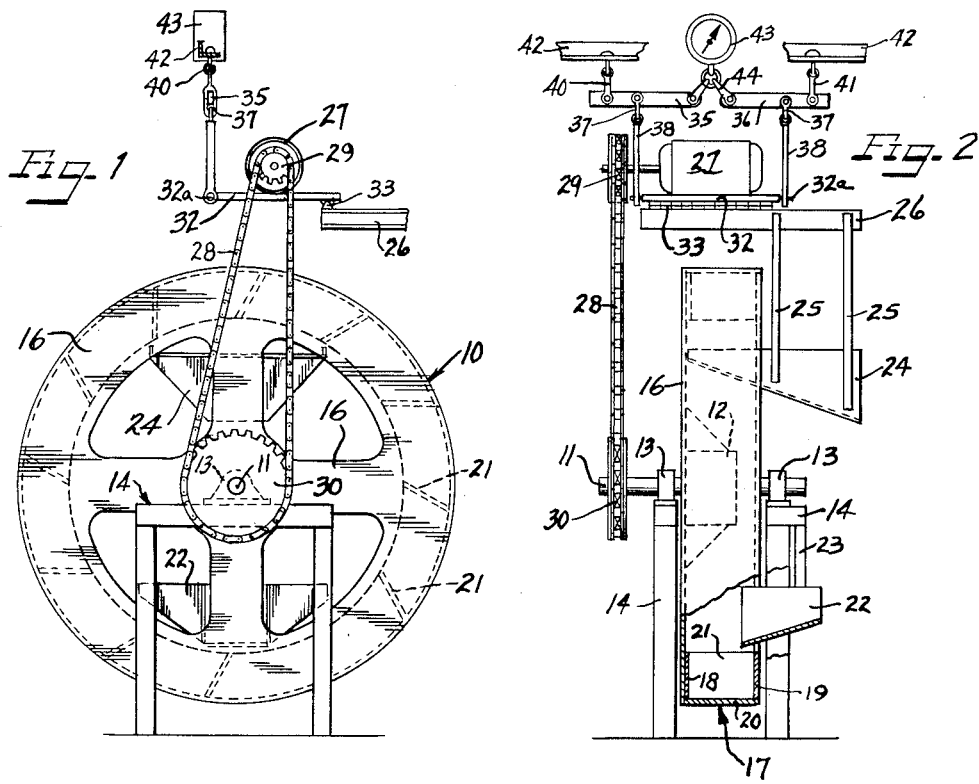
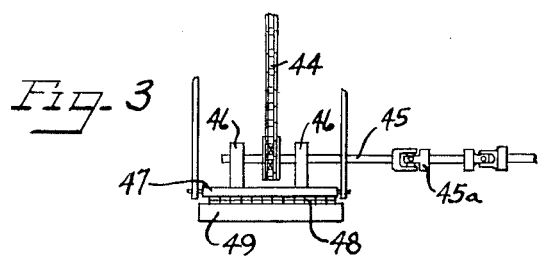
Inventors
ROBERT M. CARRIER, JR.
MAURICE G. WHITLEY
The Firm of Charles W. Hill
by
Attys.

June 17, 1952   R. M. CARRIER, JR., ET AL   2,600,966
METHOD OF AND APPARATUS FOR CONTINUOUSLY
WEIGHING AGGREGATE
Filed Aug. 12, 1947   2 SHEETS—SHEET 2
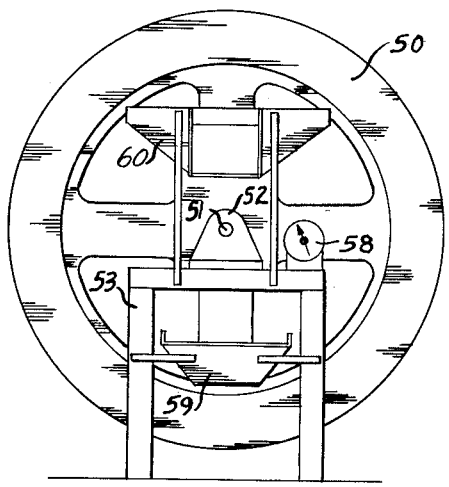
Fig. 4
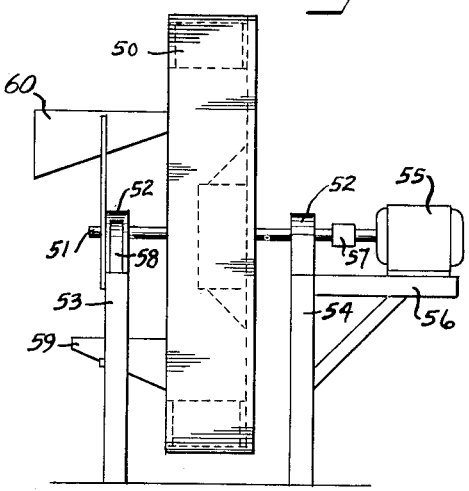
Fig. 5
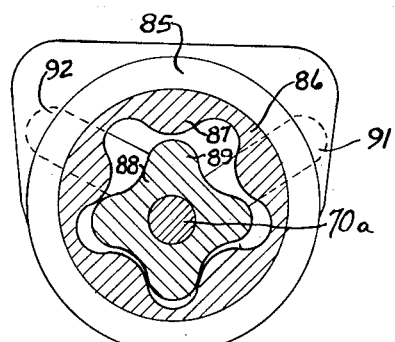
Fig. 7
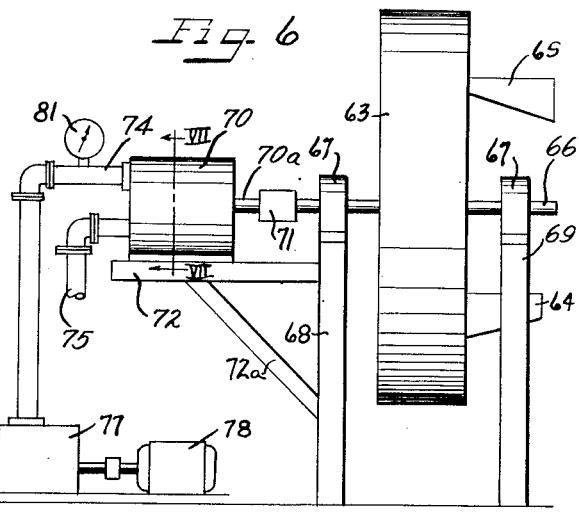
Fig. 6
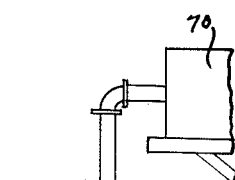
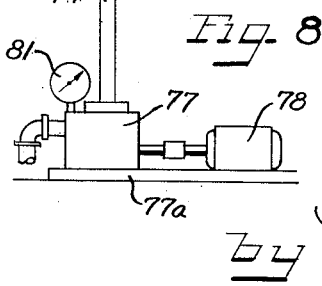
Fig. 8
Inventors
ROBERT M. CARRIER, JR.
MAURICE G. WHITLEY
by The Firm of Charles W. Hill
Attys.

Patented June 17, 1952

2,600,966

UNITED STATES PATENT OFFICE 2,600,966

METHOD OF AND APPARATUS FOR CONTINUOUSLY WEIGHING AGGREGATE

Robert M. Carrier, Jr., Aurora, Ill., and Maurice G. Whitley, Louisville, Ky., assignors to Carrier Conveyor Corporation, Louisville, Ky., a corporation of Kentucky Application August 12, 1947, Serial No. 768,134

12 Claims. (Cl. 265—27)

This invention relates to improvements in a method of and apparatus for continuously weighing aggregate, and more particularly, to an improved method of and apparatus for measuring and recording the weight of the aggregate as it is conveyed from one point to another.

It is an object of this invention to provide apparatus for continuously weighing and discharging material and recording the rate at which the material is discharged.

Another object of this invention is to provide an improved method of and means for weighing aggregate as it is being conveyed upwardly to an elevated work position.

A further object of this invention is to provide apparatus for continuously weighing material by measuring and recording the torque developed while the material is moved from one elevation to another.

A still further object of this invention is to provide apparatus for continuously weighing material by measuring the power used during the raising of material from one elevation to another.

A further object of this invention is to provide apparatus through which the discharge flow rate may be maintained substantially constant.

According to the general features of this invention there is provided a wheel type rotary bucket conveyor driven through a chain and sprocket drive by a motor. The motor is mounted on a platform that is arranged to pivot in response to the pull exerted on the chain by the motor in rotating the loaded conveyor. This pivoting of the platform is carried out against the resistance of a scale mechanism which measures the pull at the outer end of the platform and, therefor, indirectly measures the pull on the chain and the torque of the motor.

Another feature is a modified form of this invention in which a rotary type conveyor is mounted for rotation by a constant speed motor secured to the shaft of the conveyor, the power output of the motor being measured by a wattmeter and recorded as pounds of material discharged per minute at the rated speed.

A further feature of this invention resides in the provision of a rotary type conveyor mounted for rotation by a hydraulic motor secured to the shaft of the conveyor, the discharge rate of the material being determined by measuring the fluid pressure in the line to the hydraulic motor.

Other objects, features and advantages of this invention will become apparent to one skilled in the art from the following description of the embodiments illustrated in the accompanying drawing, wherein:

Figure 1 is a side elevational view of the conveyor and weighing apparatus of this invention;

Figure 2 is an end elevational view, partly broken away and partly in section, of the conveying and measuring apparatus of Figure 1;

Figure 3 is a fragmentary, side elevational view of a modified form of the weighing apparatus of Figure 1;

Figure 4 is a side elevational view of a second embodiment of the conveying and weighing apparatus of this invention;

Figure 5 is an end elevational view of the conveying and weighing apparatus of Figure 4;

Figure 6 is a side elevational view, partly broken away, of a third embodiment of the conveying and measuring apparatus of this invention;

Figure 7 is a vertical sectional view taken substantially on line VII—VII of Figure 6 looking in the direction indicated by the arrows; and Figure 8 is a fragmentary, side elevational view of a modified form of the apparatus of Fig. 6.

As shown on the drawings:

In the embodiment of the subject invention illustrated in Figures 1 and 2, the reference numeral 10 indicates a rotary conveyor wheel or flight mounted for rotation in a substantially vertical plane on a central axle 11. The axle 11 passes through an enlarged bearing portion 12 of the conveyor wheel and is journaled on either side of the wheel in a pillow block 13 secured on the upper surface of a frame support structure 14.

The conveyor wheel 10 comprises a web plate 16 which is secured substantially perpendicular to the bearing portion 12. U-shaped annular trough 17 is secured as by welding to the outer marginal portion of the plate 16. This trough may suitably consist of two annular side plates 18 and 19 enclosed by a peripheral member 20 and suitably secured thereto as by welding.

A plurality of shelves 21 are secured as by welding between the side plates 18 and 19 and the peripheral member 20. These shelves are slanted to provide pockets in which material is carried upwardly as the conveyor rotates counterclockwise, as viewed in Figure 1.

Material is deposited in each pocket of the conveyor when the pocket is at the bottom of its swing by means of a chute 22 which is supported by a bracket 23, secured to one memer of the support structure 14. The lower end of the chute extends into the open side of the conveyor and overlies the pocket of the conveyor as it passes therebeneath. As the loaded pocket nears the top of its swing, the slope of the shelf will cause the material to slide out of the pocket into a convenient discharge chute 24, which may be advantageously supported by straps 25 depending from an overhead support structure 26.

The rotary conveyor of this invention is driven from a motor 27 by means of a chain 28 disposed over a sprocket 29 on the motor shaft and a sprocket 30 on the conveyor shaft. The motor 27 is secured to a platform 32 which is pivotally attached by a hinge assembly 33 to the overhead support structure 26. At its free end the platform 32 is suspended from a pair of cross arms 35 and 36, each cross arm being pivotally connected to a short link 37 which is pivotally secured to a relatively long link 38 extending upwardly in pivoting relation from pins 32a at the side of the platform 32. The outer end of each of the cross arms 35 and 36 is secured by pivotable links 40 and 41 to a rigid angle member 42, while the inner end is pivotally connected to a scale 43 by means of a link 44.

The scale 43 may be of any standard type having an indicator hand for registering the weight.

To put the apparatus of Figures 1 and 2 into operation the conveyor is rotated at constant speed by means of the motor 27 when there is no material in the pockets of a conveyor. Under these operation conditions, the dial of the scale is set at zero (0) to compensate for the torque developed in rotating the empty conveyor. Then, while the conveyor is rotating at a constant speed, 10 R. P. M. for example, known weights, for example 20 pounds, are deposited in each pocket as it passes the inlet chute. Since, in the conveyor illustrated in Figure 1, there are twelve (12) pockets, 240 pounds of material will be elevated each revolution, and, at 10 R. P. M., 2400 pounds of material per minute will be conveyed. With the conveyor operating under these known conditions, the point on the dial indicated by the indicating hand is marked 2400 pounds per minute. The dial can then be calibrated at 100 pound per minute increments.

In operation, the greater the load in the conveyor, the greater will be the work required to rotate it and consequently the greater will be the pull on the chain 28 between the motor sprocket and the conveyor sprocket. The tighter the chain 28 is pulled the more it will tend to pivot the platform 32 downwardly against the resistance of the scale 43. Thus any increase in torque required for rotating the conveyor will be recorded on the scale as an increase in quantity of material discharged per minute, which is actually what caused the increase in torque.

It is evident, of course, that the weight of material actually in the wheel at any time can be readily regulated by controlling the supply of material to the inlet chute 22. Therefore, if the unit weight of the material varies, the discharge in pounds per minute may be kept substantially constant by either increasing or decreasing the flow of aggregate to the wheel. Also, it will be appreciated that any variation in the weight of material supplied to the wheel will be indicated by the scale. This affords an advantageous arrangement whereby the weight of an admixture may be automatically varied by a mechanism controlled from the scale according to the variations in the weight of material supplied. Thus, the desired predetermined percentage of admixture may be held constant for variations in the weight of material supplied.

In Figure 3 is shown a modification of the scale mechanism and conveyor drive means of the conveyor of Figure 1. In this modification the chain 44 leading to the conveyor shaft is driven by a drive shaft 45 which may be connected through a universal joint 45a to any suitable power source which may be advantageously located at ground level. The drive shaft 45 is journaled in bearings 46 on either side of the chain 44. The bearings 46 are mounted on a platform 47 which is disposed for pivoting about a fixed support 49 by means of a hinge assembly 48. The free end of the platform 47 may be secured to the scale mechanism in the same manner as the platform 32 of Figure 1.

This modification affords a convenient means for using a prime mover, such as a gasoline engine, which is mounted on the ground or in another position where the shaft is not in line with the bearings mounted on the pivoting platform.

In Figures 4 and 5 is shown a modification of the weighing apparatus of this invention. A rotary conveyor 50, identical in construction to that of Figure 1, is supported for rotation on an axle 51 which is journaled at either side of the conveyor in pillow blocks 52 affixed to the top of support structures 53 and 54. A motor 55, preferably of the synchronous type, is secured on a platform 56 at one side of the support structure 54, and arranged to drive the conveyor shaft through a suitable coupling 57. An inlet chute 59 and an outlet chute 60 are provided projecting into the open side of the conveyor. A wattmeter 58, connected to record the power output of the motor 55, may be conveniently mounted on support structure 53 adjacent the inlet chute 59.

The conveyor illustrated in this modification may be conveniently calibrated as described in connection with the conveyor of Figure 1. Thus, disregarding small losses in the motor, the wattmeter will measure the energy used in elevating material in the wheel, and will record the amount of material discharged per unit time as the wheel rotates at constant speed.

Thus, there is provided a simple apparatus for accurate continuous weighing of material discharged from a conveyor.

In Figures 6 and 7, there is disclosed another modification of the weighing apparatus of this invention. A rotary conveyor 63, similar in construction to that of Figure 1 and having an inlet chute 64 and a discharge chute 65, is mounted for rotation on a shaft 66 which is journaled at either side of the conveyor in pillow blocks 67 affixed to the top of support structures 68 and 69. A hydraulic motor 70 is mounted on a platform 72 which is supported by braces 72a from the structure 68 and the shaft 70a of the motor 70 is connected by a coupling 71 to the conveyor shaft 66. The hydraulic motor 70 has an intake pipe 74 and a discharge pipe 75. Fluid under pressure is supplied to the motor 70 through the pipe 74 from a pump 77 driven by a motor 78. The pump 77 has an intake connection 80.

A pressure gauge 81 is mounted in the intake pipe 74 to measure the pressure of the fluid delivered to the hydraulic motor.

In operation the pump 77 is driven at a rate such that the hydraulic motor and the empty conveyor are rotated at a constant predetermined speed. It is evident that to maintain this speed when material is deposited in the pocket of this conveyor, fluid under greater pressure will be required than when the conveyor is empty. Thus, the pressure in the intake line 74 is a true measure of the energy expended in elevating the material.

The dial of the pressure gauge 81 may be calibrated as previously indicated for the other embodiments of this invention.

In Figure 7 is shown a rotary pump suitable for use as a hydraulic motor. This pump comprises a casing 85 having a central opening in which a ring gear 86 having internal teeth 87 is journaled for rotation. A cooperating pinion gear 88 with external teeth 89 is eccentrically mounted inside the ring gear 86. The pinion gear is secured to a drive shaft 70a of the hydraulic motor 70. This drive shaft is, as previously seen, coupled to the conveyor shaft 66 for driving the same. The teeth of the pinion gear and of the ring gear are so designed that the teeth and tooth spaces of the meshing gears form a series of gradually expanding closed chambers during part of a revolution and a series of gradually contracting closed chambers during another part of the revolution; and the ports are so arranged that when the unit is operating as a pump the expanding chambers serve to pump such fluid from an inlet port 91 and the contracting chambers serve to expel fluid through an outlet port 92. When the unit is operated as a hydraulic motor the fluid entering the inlet port 91 will cause counterclockwise rotation of the gears and of the axle 70a.

In Figure 8 is disclosed a modification of the weighing and conveying apparatus of Figure 6. It will be appreciated that vibrations which are inherent in any rotating mechanism may cause slight inaccuracies in the operation of the gauge. In this modification the gauge 81 is mounted on the housing of the pump 77 which is, of course, secured to a solid base member 77a. Thus, the gauge will record the pressure in the discharge line 74 leading from the pump without being effected by vibrations from the machine.

From the foregoing description it is seen that in this invention there is provided various means for accurately weighing material as it is being continuously moved from one work station to another. Convenient means is provided through which the rate with which the material is handled may be controlled so that the weight of the material conveyed may be varied according to the bulk of the material being handled. Also, the variations in weight of the material being handled can be conveniently used to vary the weight of other materials being mixed therewith in order that the composition of the mixture may be kept uniform.

This invention is particularly adapted to handle granular material or material in bulk form such as sand, gravel, coal, cement, cereal and the like. It is also evident that since the pockets of this rotary conveyor are made of a metal, such as steel, it is particularly adapted to handle hot materials. Thus, hot objects having sharp edges may be conveniently weighed by the apparatus of this invention without the danger of burning holes in the conveyor or of tearing the conveying surface.

The apparatus of each embodiment of this invention herein disclosed may be easily and accurately installed and is simple to maintain and operate.

It will, of course, be understood that various details of construction may be varied over a wide range without departing from the principles of this invention, and it is therefore not the purpose to limit the patent granted hereon otherwise than necessitated by the scope of the appended claims.

We claim as our invention:

1. A weighing device comprising in combination a support structure, a shaft journaled in said structure, a conveyor mounted for rotation on said shaft, a second support structure, a platform pivotally mounted at one end on said second support structure, a motor mounted on said platform and arranged to drive said shaft, a chain drive between said motor and said conveyor, and a scale mechanism secured to the free end of said platform to measure the downward pull of said chain as said conveyor is rotated.

2. A weighing device comprising in combination, a support structure, a shaft journaled in said structure, a conveyor mounted for rotation on said shaft and adapted to elevate conveyable material, a hydraulic motor arranged for driving said shaft, and pressure-sensitive, weight-indicating means calibrated in weight units for measuring variations in the power developed by said hydraulic motor in rotating said conveyor to continuously weigh the conveyable material during elevation thereof.

3. A weighing device comprising a support structure, a shaft journaled in said structure, a wheel type conveyor mounted for rotation about said shaft in a substantially vertical plane, a second support structure, a platform pivotally mounted at one end of said second support structure, a drive shaft journaled on said platform, a chain drive between said conveyor and said drive shaft, flexible means for driving said drive shaft and means calibrated in weight units and responsive to the tension of said drive chain for indicating the weight on the conveyor.

4. In a conveyor structure, a weighing device to continuously weigh conveyed material comprising a support structure, a shaft journalled in said structure, a conveyor mounted for rotation on said shaft, a hydraulic motor arranged for driving said shaft, a pump for delivering liquid under pressure to said motor and a gauge mounted on the pump housing on the discharge side of said pump and calibrated in weight units to indicate the weight on said conveyor.

5. In a conveyor structure, an elevatable conveyor flight adapted to carry a conveyor material, a prime mover to elevate said flight, said conveyor structure having an inlet and an outlet spaced above said inlet and adapted to receive the conveyable material elevated by said conveyor flight, energy measuring means connected to said prime mover and actuatable as a function of the energy delivered by said prime mover to said conveyor flight, and weight indicating means cooperating with said energy measuring means and responsive to variations in the measured energy to continuously indicate the quantity of conveyable material carried by said conveyor flight during elevation thereof.

6. In a conveyor structure as defined in claim 5, said prime mover comprising a rotatable motor having a rotatable driving connection with said conveyor flight, said energy measuring means comprising a pivotally hinged support structure to carry said rotatable motor, said support structure arranged to be pivotally displaceable in response to changing torques exerted by said motor and said weight measuring means comprising a scale having an actuating connection with said support structure.

7. In a conveyor structure as defined in claim 5, said prime mover comprising an electric motor having a rotatable driving connection with said conveyor flight, said energy measuring means comprising electric power measuring means connected to said motor to measure the electric power input thereto, and said weight measuring means comprising an indicator device actuatably driven by said power measuring means.

8. In a conveyor structure as defined in claim 5, said prime mover including a hydraulic engine having a driving connection with said conveyor flight, said energy measuring means comprising a pressure sensitive means to measure variations in hydraulic pressure at said engine and said weight measuring means comprising an indicator device actuatably driven by said pressure sensitive device.

9. In a method of continuously weighing moving material, the steps which include arranging variable quantities of a conveyable material for transit by a conveyor flight, imparting variable quantities of force to the conveyor flight to move variable quantities of material on said flight at a substantially constant speed, producing a measurement of the variations of force imparted to the conveyor flight and continuously indicating in terms of weight units the quantity of conveyable material carried by the conveyor flight in response to variations in said measurements.

10. In a method of continuosuly weighing moving material as defined in claim 9 wherein said force is imparted to the conveyor flight by operating a prime mover delivering a torque output and said measurements are produced by measuring variations in the torque output of the prime mover.

11. In a method of continuously weighing moving material as defined in claim 9 wherein said force is imparted to the conveyor flight by operating an electric prime mover and said measurements are produced by measuring variations in the power input to the prime mover.

12. In a method of continuously weighing moving material as defined in claim 9 wherein said force is imparted to the conveyor flight by operating a prime mover including a hydraulic engine and said measurements are produced by measuring variations in the hydraulic pressure at the hydraulic engine.

ROBERT M. CARRIER, Jr.
MAURICE G. WHITLEY.

REFERENCES CITED

The following references are of record in the file of this patent:

UNITED STATES PATENTS

| Number | Name | Date |
|---|---|---|
| 945,636 | Svenson | Jan. 4, 1910 |
| 1,186,218 | Merrick | June 6, 1916 |
| 1,449,458 | Sutermeister | Mar. 27, 1923 |
| 1,898,890 | Perry | Feb. 21, 1933 |
| 1,961,178 | Thomas | June 5, 1934 |
| 2,017,225 | Witham | Oct. 15, 1935 |
| 2,372,595 | Maxon | Mar. 27, 1945 |

OTHER REFERENCES

Link-Belt Catalog #800, copyright 1939, page 1052.